US010771369B2

(12) United States Patent
Auvenshine et al.

(10) Patent No.: US 10,771,369 B2
(45) Date of Patent: Sep. 8, 2020

(54) ANALYZING PERFORMANCE AND CAPACITY OF A COMPLEX STORAGE ENVIRONMENT FOR PREDICTING EXPECTED INCIDENT OF RESOURCE EXHAUSTION ON A DATA PATH OF INTEREST BY ANALYZING MAXIMUM VALUES OF RESOURCE USAGE OVER TIME

(71) Applicant: International Business Machines Corporation, Armonk, NY (US)

(72) Inventors: John J. Auvenshine, Tucson, AZ (US); Perry J. Gallo, Tucson, AZ (US); Bent B. Holst, Broendby (DK); Mikael H. Lindstrom, Sollentuna (SE)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 15/462,987

(22) Filed: Mar. 20, 2017

(65) Prior Publication Data
US 2018/0270128 A1 Sep. 20, 2018

(51) Int. Cl.
*H04L 12/26* (2006.01)
*H04L 12/24* (2006.01)
(Continued)

(52) U.S. Cl.
CPC .............. *H04L 43/16* (2013.01); *G06F 3/067* (2013.01); *H04L 41/147* (2013.01);
(Continued)

(58) Field of Classification Search
CPC ... H04L 43/16; H04L 41/147; H04L 43/0876; H04L 67/1097; H04L 43/0829;
(Continued)

(56) References Cited

U.S. PATENT DOCUMENTS 5,720,003 A * 2/1998 Chiang ................ G06N 99/005
706/10
5,796,633 A * 8/1998 Burgess .............. G06F 11/3495
702/187

(Continued)

FOREIGN PATENT DOCUMENTS

| EP | 1989825 | 5/2011 |
| JP | 5052533 | 10/2012 |
| WO | WO0165268 | 9/2001 |

*Primary Examiner* — Daniel C. Murray
(74) *Attorney, Agent, or Firm* — Schmeiser, Olsen & Watts, LLP; James Nock

(57) ABSTRACT

A method for predicting a failure of a complex storage environment is provided. An earliest expected incident of resource exhaustion on a data path of interest is predicted. The method includes monitoring a current utilization of one or more resources over a data path of interest, and calculating a maximum utilization threshold for each resource, such that exceeding the maximum utilization threshold adversely impacts one or more performance measures. An expected performance threshold is created that is associated with an expected performance. A maximum values of resource usage over time is analyzed to predict when the expected performance will fall outside of an acceptable overall performance threshold for the data path of interest to determine an earliest expected incident of resource exhaustion.

19 Claims, 6 Drawing Sheets

(51) Int. Cl.
*G06F 3/06* (2006.01)
*H04L 29/08* (2006.01)

(52) U.S. Cl.
CPC ...... *H04L 43/0876* (2013.01); *H04L 41/0631* (2013.01); *H04L 43/0829* (2013.01); *H04L 43/0852* (2013.01); *H04L 43/0888* (2013.01); *H04L 67/1097* (2013.01)

(58) Field of Classification Search
CPC ............. H04L 43/0888; H04L 41/0631; H04L 43/0852; G06F 3/067
See application file for complete search history.

(56) References Cited

U.S. PATENT DOCUMENTS

| | | | | |
|---|---|---|---|---|
| 5,828,583 | A * | 10/1998 | Bush | G06F 11/004 702/185 |
| 6,018,300 | A * | 1/2000 | Dowden | H04L 41/0681 340/635 |
| 6,073,089 | A * | 6/2000 | Baker | G06F 11/0709 702/185 |
| 6,182,022 | B1 * | 1/2001 | Mayle | G06F 11/3409 702/182 |
| 6,377,907 | B1 * | 4/2002 | Waclawski | G06F 11/3409 702/179 |
| 6,415,189 | B1 * | 7/2002 | Hajji | G01M 13/045 324/662 |
| 6,418,416 | B1 * | 7/2002 | Rosenberg | G06Q 10/087 705/22 |
| 6,557,035 | B1 * | 4/2003 | McKnight | G06F 11/3452 709/202 |
| 6,633,834 | B2 * | 10/2003 | Conrad | H04L 41/0206 702/188 |
| 6,704,284 | B1 * | 3/2004 | Stevenson | H04L 41/5003 370/241 |
| 6,771,440 | B2 * | 8/2004 | Smith | G11B 20/1816 360/25 |
| 6,865,549 | B1 * | 3/2005 | Connor | G06F 9/52 705/51 |
| 6,901,376 | B1 * | 5/2005 | Sculler | G06Q 10/10 705/26.8 |
| 6,993,453 | B2 * | 1/2006 | Krissell | G06F 11/3409 702/182 |
| 7,050,936 | B2 * | 5/2006 | Levy | G06F 11/008 702/179 |
| 7,076,695 | B2 * | 7/2006 | McGee | G06F 11/0709 702/179 |
| 7,110,976 | B2 * | 9/2006 | Heimermann | G06Q 10/0631 705/37 |
| 7,149,657 | B2 * | 12/2006 | Goebel | G06Q 10/06 702/183 |
| 7,181,651 | B2 * | 2/2007 | Gross | G06F 11/0751 714/37 |
| 7,191,367 | B2 * | 3/2007 | Ito | G06F 11/008 714/42 |
| 7,203,746 | B1 * | 4/2007 | Harrop | G06F 9/5022 709/224 |
| 7,236,911 | B1 * | 6/2007 | Gough | G06F 11/008 702/185 |
| 7,272,755 | B2 * | 9/2007 | Smith | G06F 11/2257 714/4.2 |
| 7,280,988 | B2 * | 10/2007 | Helsper | G06F 11/3006 702/182 |
| 7,299,367 | B2 * | 11/2007 | Hamm | H01L 22/20 257/E21.525 |
| 7,324,966 | B2 * | 1/2008 | Scheer | G06Q 10/087 705/28 |
| 7,340,598 | B2 * | 3/2008 | Esfahany | G06F 11/3409 709/220 |
| 7,370,241 | B2 * | 5/2008 | Nicholson | G06F 11/008 702/185 |
| 7,373,402 | B2 * | 5/2008 | Connelly | H04L 41/5067 709/220 |
| 7,409,314 | B2 * | 8/2008 | Childress | G06F 11/3409 702/182 |
| 7,457,763 | B1 * | 11/2008 | Garrow | G06Q 10/06 705/7.24 |
| 7,490,145 | B2 * | 2/2009 | Sylor | H04L 41/06 709/223 |
| 7,496,796 | B2 * | 2/2009 | Kubo | G06F 11/008 714/42 |
| 7,577,888 | B2 * | 8/2009 | Sudhakar | G05B 23/0229 714/732 |
| 7,624,174 | B2 * | 11/2009 | Sanghvi | G06F 11/0754 709/224 |
| 7,673,191 | B2 * | 3/2010 | Addleman | G06F 11/0709 714/47.2 |
| 7,676,706 | B2 * | 3/2010 | Addleman | G06F 11/3419 714/47.2 |
| 7,698,113 | B2 | 4/2010 | Steinbach et al. | |
| 7,835,945 | B2 * | 11/2010 | Scruton | G06Q 10/10 705/26.4 |
| 8,032,867 | B2 * | 10/2011 | Bansal | G06F 11/3419 717/127 |
| RE43,144 | E * | 1/2012 | Creemer | H04L 41/147 370/229 |
| 8,234,229 | B2 * | 7/2012 | Castelli | H04L 41/00 703/13 |
| 8,347,146 | B2 * | 1/2013 | Bell | G06F 11/008 714/37 |
| 8,386,325 | B2 * | 2/2013 | Bock | G06Q 10/087 705/26.1 |
| 8,401,928 | B2 * | 3/2013 | Herrmann | G06Q 10/10 705/26.81 |
| 8,600,915 | B2 * | 12/2013 | Thompson | G06F 11/0709 706/12 |
| 8,644,185 | B2 * | 2/2014 | Sims | H04L 43/0888 370/253 |
| 8,650,491 | B2 * | 2/2014 | Jia | H04L 67/125 715/705 |
| 8,719,627 | B2 * | 5/2014 | Watson | G06F 11/3442 714/13 |
| 8,756,310 | B2 * | 6/2014 | Agarwala | H04L 43/0882 709/224 |
| 8,832,267 | B2 * | 9/2014 | Kupershmidt | G06Q 10/0631 709/224 |
| 9,043,327 | B1 * | 5/2015 | Dunagan | G06Q 10/10 707/737 |
| 9,104,392 | B1 * | 8/2015 | Dunagan | G06F 16/24575 |
| 9,250,974 | B1 * | 2/2016 | Estes | G06F 9/5072 |
| 9,414,244 | B2 * | 8/2016 | Ibbotson | H04W 24/04 |
| 9,658,784 | B1 * | 5/2017 | Ahmad | G06F 3/0616 |
| 9,817,864 | B1 * | 11/2017 | Dunagan | G06F 11/30 |
| 9,892,014 | B1 * | 2/2018 | Hickey | G06F 11/3452 |
| 2002/0076143 | A1 * | 6/2002 | Foltzer | H04B 10/032 385/24 |
| 2002/0174384 | A1 * | 11/2002 | Graichen | G06F 11/008 714/37 |
| 2003/0004679 | A1 * | 1/2003 | Tryon, III | G06F 11/008 702/182 |
| 2003/0007623 | A1 * | 1/2003 | Gilles | G06Q 20/202 379/220.01 |
| 2003/0023719 | A1 * | 1/2003 | Castelli | H04L 41/00 709/224 |
| 2003/0033179 | A1 * | 2/2003 | Katz | G06Q 10/063 705/7.12 |
| 2003/0061546 | A1 * | 3/2003 | Collins | G06F 11/3476 714/42 |
| 2003/0204788 | A1 * | 10/2003 | Smith | G06F 11/004 714/47.3 |
| 2004/0051988 | A1 * | 3/2004 | Jing | G11B 19/04 360/31 |
| 2004/0103337 | A1 * | 5/2004 | Smith | G06F 11/008 714/2 |
| 2004/0199573 | A1 * | 10/2004 | Schwartz | G05B 23/0229 709/201 |

(56) References Cited

U.S. PATENT DOCUMENTS

| | | | |
|---|---|---|---|
| 2004/0208119 A1* | 10/2004 | Christodoulou | H04L 29/06 370/228 |
| 2004/0268189 A1* | 12/2004 | Constantinescu | G06F 11/008 714/704 |
| 2005/0044451 A1* | 2/2005 | Fry | G06F 11/008 714/38.1 |
| 2005/0096953 A1* | 5/2005 | Washington | G06Q 10/06 705/7.28 |
| 2005/0144095 A1* | 6/2005 | Scruton | G06Q 10/10 705/30 |
| 2005/0177435 A1* | 8/2005 | Lidow | G06Q 10/06 705/22 |
| 2007/0018601 A1* | 1/2007 | Steinbach | G06F 11/3447 318/568.11 |
| 2007/0101202 A1* | 5/2007 | Garbow | G06F 11/008 714/47.2 |
| 2007/0208920 A1* | 9/2007 | Tevis | H04L 43/16 711/170 |
| 2007/0226631 A1* | 9/2007 | Tevis | H04L 43/16 715/736 |
| 2008/0235365 A1* | 9/2008 | Bansal | H04L 43/06 709/224 |
| 2009/0150788 A1* | 6/2009 | Jia | H04L 67/36 715/735 |
| 2010/0070324 A1* | 3/2010 | Bock | G06Q 10/087 705/28 |
| 2010/0070946 A1* | 3/2010 | Herrmann | G06Q 10/10 717/102 |
| 2011/0078467 A1* | 3/2011 | Hildebrand | G06F 1/3203 713/310 |
| 2011/0213880 A1* | 9/2011 | Neuse | H04L 41/082 709/224 |
| 2012/0023041 A1* | 1/2012 | Kariv | G06F 11/3447 706/12 |
| 2012/0102369 A1* | 4/2012 | Hiltunen | G06F 11/008 714/48 |
| 2012/0151053 A1* | 6/2012 | Kato | G06F 11/3409 709/224 |
| 2012/0173384 A1* | 7/2012 | Herrmann | G06Q 10/10 705/26.8 |
| 2014/0006599 A1* | 1/2014 | Hohndel | G06F 11/3452 709/224 |
| 2014/0257907 A1* | 9/2014 | Chen | G06Q 10/06312 705/7.22 |
| 2014/0325068 A1* | 10/2014 | Assuncao | H04L 41/082 709/226 |
| 2015/0120366 A1* | 4/2015 | Cirihal | G06Q 30/0637 705/7.25 |
| 2015/0261649 A1 | 9/2015 | Boehm et al. | |
| 2015/0312124 A1* | 10/2015 | Curtin | G06F 16/00 709/224 |
| 2016/0098455 A1* | 4/2016 | Curtin | H04L 67/1097 707/738 |
| 2016/0117180 A1* | 4/2016 | Cardonha | G06F 11/3495 713/100 |
| 2016/0210061 A1* | 7/2016 | Soncodi | G06F 3/0605 |
| 2017/0004012 A1* | 1/2017 | Brown | G06F 9/5011 |
| 2017/0359229 A1* | 12/2017 | Dintenfass | H04L 67/22 |
| 2017/0359230 A1* | 12/2017 | Dintenfass | H04L 41/22 |
| 2017/0359245 A1* | 12/2017 | Dintenfass | H04L 41/147 |
| 2017/0359351 A1* | 12/2017 | Dintenfass | H04L 63/105 |
| 2017/0374147 A1* | 12/2017 | McNair | H04L 67/1097 |
| 2018/0027060 A1* | 1/2018 | Metsch | G06F 3/0613 709/226 |
| 2018/0123923 A1* | 5/2018 | Zhou | G06F 13/20 |

* cited by examiner

ANALYZING PERFORMANCE AND CAPACITY OF A COMPLEX STORAGE ENVIRONMENT FOR PREDICTING EXPECTED INCIDENT OF RESOURCE EXHAUSTION ON A DATA PATH OF INTEREST BY ANALYZING MAXIMUM VALUES OF RESOURCE USAGE OVER TIME

BACKGROUND

The present invention relates to systems and methods for predicting failure of a complex storage environment, and more specifically to embodiments of analyzing capacity and performance of the complex storage network to provide an expected occurrence of resource exhaustion.

SUMMARY

An aspect of this invention relates to a method, and associated computer system and computer program product, for analyzing performance and capacity of a complex storage environment. A processor of a computing system monitors a current utilization of one or more resources associated with the plurality of components and subcomponents over a data path of interest, wherein the one or more resources affect one or more performance measures of the complex storage environment. A maximum utilization threshold is calculated for each resource of the one or more resources, such that exceeding the maximum utilization threshold adversely impacts one or more performance measures. An expected performance threshold associated with an expected performance for each performance measure of the one or more performance measures over the data path of interest is created. An actual performance for each performance measure is ascertained, based on the monitoring of the current utilization. Maximum values of resource usage are analyzed over time to predict when the expected performance will fall outside of an acceptable overall performance threshold for the data path of interest. An earliest expected incident of resource exhaustion on the data path of interest is determined based on the analyzing of the maximum values of resource usage over time.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Maintaining adequate performance in a complex storage environment that is made up of many subcomponents and links is difficult. For example, a virtualized Storage Area Network (SAN) may include storage devices connected by a SAN switch to a virtualization device, which is in turn connected by another SAN switch to a server. Each of these components in a data path of interest is subject to both its technical capabilities, such as I/Os per second and gigabytes per second, as well as load from various other users sharing the component. Often times, performance problems arise unexpectedly, and determining their root cause is difficult. Knowing when to expect to expand or replace a component in order to maintain acceptable performance is also difficult.

A virtualized Storage Area Network (SAN) may include a plurality of components and subcomponents. Each of the components and subcomponents in a data path of interest has a performance and/or capacity limit. If the limit of the components is exceeded to the point that performance is unacceptable or failure occurs, users must replicate, expand, replace or repair one or components of the SAN. Performing these corrective actions after performance suffers or failure occurs can be costly and time consuming.

Thus, a need exists for predicting how close actual performance of a SAN system is to unacceptable performance or failure by determining limits and/or thresholds of the components or performance measures of the system, wherein a user is automatically alerted when the actual performance is close to the limits and/or thresholds.

Figure 1:
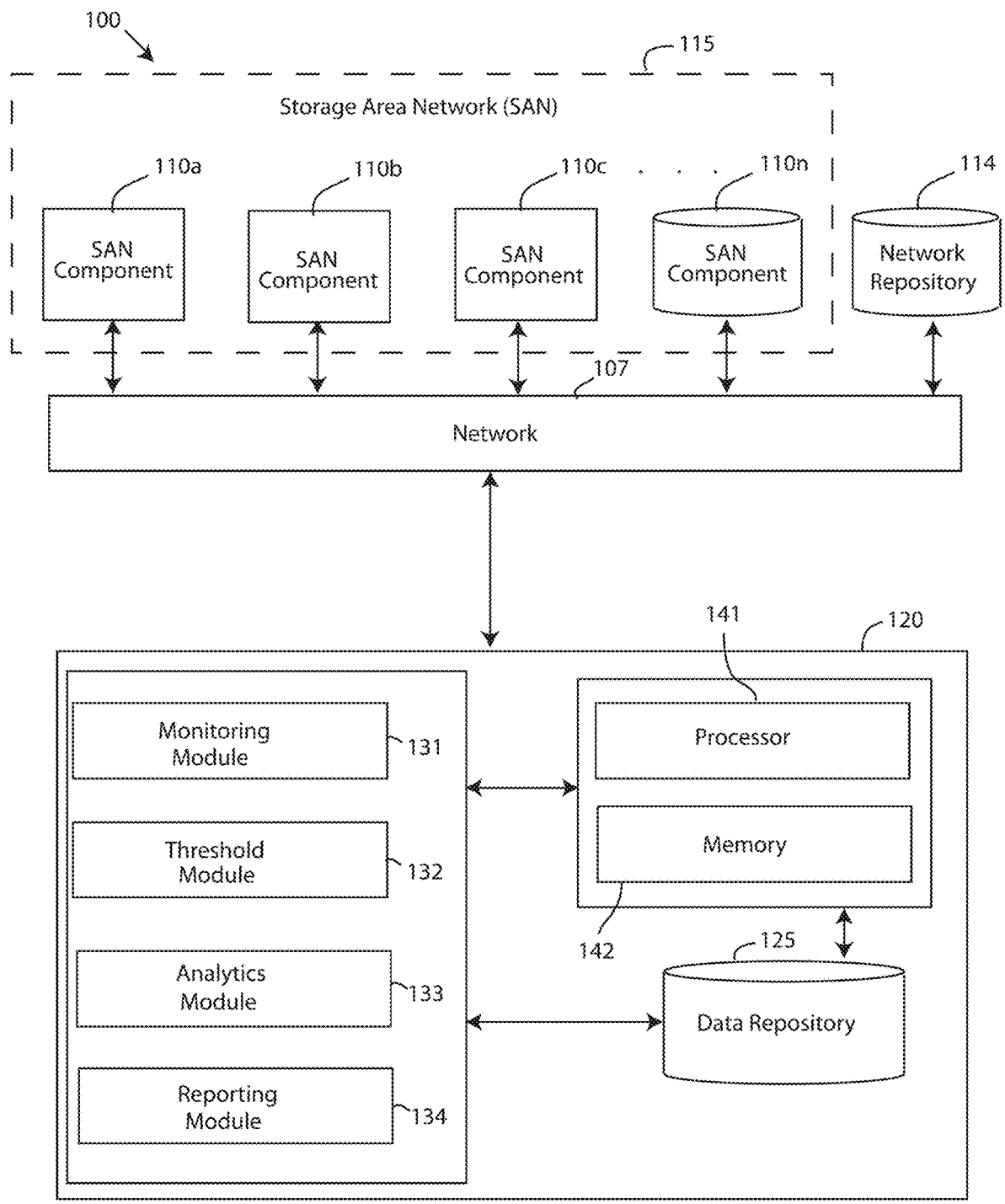
FIG. 1 depicts a block diagram of a predictive failure system, in accordance with embodiments of the present invention.

Referring to the drawings, FIG. 1 depicts a block diagram of a predictive failure system 100, in accordance with embodiments of the present invention. Embodiments a predictive failure system 100 may be described as a system for predicting a failure of a complex storage environment, such as a SAN system or network 115, IP storage system, Fiber Channel Over Ethernet (FCoE), or Internet Small Computer System Interface (iSCSI), as well as network services like web servers, databases, and the like. The predictive failure system 100 may create, establish, determine, calculate, etc. one or more limits or thresholds associated with resources of the components or subcomponents of the SAN 115, as well as limits or thresholds associated with a performance of the SAN system 115, and alert a user if the limits or thresholds are violated. The limits or thresholds may be used to analyze a capacity and/or performance of the SAN system 115 and inform a user when an actual performance approaches the thresholds to allow for any corrective action prior to failure or unacceptable performance. Additionally, embodiments of the predictive failure system 100 may predict an earliest occurrence of resource exhaustion based on historical or time-series data, and notify the user of such an occurrence. The notification of the earliest incident of resource exhaustion may also allow for a user to take corrective action, such as replacing a component of the SAN system 115 with a single or multiple components having higher resource capacity prior to failure of the SAN system 115.

Embodiments of the predictive failure system 100 may comprise a complex storage environment, such as a SAN system 115, which includes a plurality of components and subcomponents, depicted as component 110a, 110b, 110c ... 110n, referred herein collectively as "components 110". The reference numbers with sub-letters and/or ellipses, for example describing components and subcomponents of the SAN system 115 as 110a, 110b, 110c, ... 110n, may signify that the embodiments are not limited only to the amount of elements actually shown in the drawings, but rather, the ellipses between the letters and the $n^{th}$ element indicate a variable number of similar elements of a similar type. For instance, with regard to the components 110 depicted in FIG. 1, any number of a plurality of components 110 may be present up to the $n^{th}$ number of components 110n, wherein the variable "n" may represent the last element in a sequence of similar elements shown in the drawing. Embodiments of the components 110 of the SAN system 115 may be components and subcomponents linked or otherwise coupled or connected to form a complex storage environment, such as SAN 115. Embodiments of the components 110 may include a server, a host bus adapter (HBA), an edge switch, a core switch, a converged network switch, a SAN volume controller (SVC) or other storage virtualization appliance, a back end storage device or appliance, a backup or archive device or appliance, a port, a controller, a disk, an array, a node, an I/O group, and the like. Each component 110 may be associated with one or more resources of the SAN system 115. Embodiments of one or more resources may include a bandwidth of ports, an internal or external bus, a connection, a buffer pool, an available cache, a processing power, a disk space, a pool space, and the like. The resources associated with the components 110 of the SAN system 115 may impact, affect, or determine a performance or capacity of the SAN system. The performance and/or capacity of the SAN system 115 may be measured as one or more performance measures. Embodiments of the one or more performance measures may include a completed input output per second (IOPS), a throughput, a latency, a drop rate of frames, packets, IOs, or transactions, and the like.

Moreover, embodiments of the components 110 may be coupled to a computing system 120 over a network 107. In an alternative embodiment, one or all of the components 110 may be connected to computing system 120 via a data bus line. The number of components 110 connecting to computer system 120 over network 107 may vary from embodiment to embodiment, and may be dependent on the size and or architecture of the SAN system 115. As shown in FIG. 1, the components 110 may transmit or offer data, information, performance metrics, resource usage or utilization, and the like, about a resource usage or utilization of the component 110 (e.g. "resource usage or resource utilization") received or obtained from the components 110 by connecting to computing system 120 over the network 107. A network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the computer network 107 may be a peer-to-peer network in some embodiments, wherein in other embodiments, the network 107 may be organized as a client/server architecture.

In some embodiments, the network 107 may further comprise, in addition to the computer system 120 and components 110, a connection to one or more network accessible knowledge bases containing information of one or more users, network repositories 114 or other systems connected to the network 107 that may be considered nodes of the network 107. In some embodiments, where the computing system 120 or network repositories 114 allocate resources to be used by the other nodes of the network 107, the computer system 120 and network repository 114 may be referred to as servers.

The network repository 114 may be a data collection area on the network 107 which may back up and save all the data transmitted back and forth between the nodes of the network 107. For example, the network repository 114 may be a data center saving and cataloging data sent by or received from the components 110 to generate both historical and predictive reports regarding a performance of capacity of the SAN system 115. In some embodiments, a data collection center housing the network repository 114 may include an analytic module capable of analyzing each piece of data being stored by the network repository 114. Further, the computer system 120 may be integrated with or as a part of the data collection center housing the network repository 114. In some alternative embodiments, the network repository 114 may be a local repository (not shown) that is connected to the computer system 120.

Referring still to FIG. 1, embodiments of the computing system 120 may include a monitoring module 131, a threshold module 132, an analytics module 133, and a reporting module 134. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Embodiments of the monitoring module 131 may include one or more components of hardware and/or software program code for monitoring a current utilization of one, most, or each of the components 110 of the SAN system 115. In an exemplary embodiment, the monitoring module 131 receives or retrieves resource usage or resource utilization information from the components 110. Embodiments of the monitoring module 131 may inventory the components 110 in all data paths of interest prior to monitoring a SAN system 115, or may inventory each component 110 as a new component 110 is added or an existing component is either modified, removed, or replaced. Furthermore, embodiments of the monitoring module 131 may determine one or more performance measures of interest per component 110. For example, the monitoring module 131 may determine a quantity and/or variability of a performance measure, such as a completed IOPS, a throughput (e.g. Gigabytes per second), a latency, and drop rates for frames, packets, IOs, and transactions. Embodiments of the monitoring module 131 may also determine component 110 resources that can affect or impact the performance measures, such as bandwidth of ports, internal/external busses and connections, buffer pools, available cache, processing, compression, deduplication, free disk space, and free pool space. Various techniques and methods may be used to determine, for each component 110, an impact of resource constraints on performance measures. For example, the monitoring module 131 may plot throughput load vs. IO latency. Information on resource limits associated with the components 110 may be gathered by obtaining technical data, using a software application such as Disk Magic, etc., isolating component 110 and performing stress tests (manual/off hours), and inferring data by observing aggregate path performance, and the like.

Additionally, embodiments of the monitoring module 131 may perform a bottleneck analysis on the path for each performance measure. As an example, the monitoring module 131 may, for each resource associated with the component 110, refer to technical specifications regarding a resource's effect on the performance measure, use historical measurements, interpolate known data, and/or retrieve a performance limit for a performance measure for a given path of a data object.

Embodiments of the monitoring module 131 may monitor a current utilization of each resource for each component 110 on each path of interest of a data object. The current utilization may refer to a current or presently measured usage or utilization of a resource or component 110. The monitoring or otherwise determining of the current utilization may result in data/information that may be used to compare to one or more thresholds, as described in greater detail infra.

With continued reference to FIG. 1, embodiments of the computing system 120 may also include a threshold module 132. Embodiments of the threshold module 132 may include one or more components of hardware and/or software program code for creating, calculating, establishing, or otherwise providing one or more thresholds associated with utilization of the resources and/or expected performance measures. For example, the threshold module 132 may calculate a maximum utilization threshold for each resource of the one or more resources of the plurality of components. The threshold module 132 may first determine a maximum utilization of a component 110, establish a threshold surrounding the maximum utilization of the component 110, and then may alert a user that the utilization is within the maximum utilization threshold and approaching the maximum utilization of the resource/component. As an example, the threshold module 132 may determine that a virtualization device node in a path of interest can support 100,000 IOPS per port before a latency of this path will exceed 20 ms (i.e. maximum utilization), thereby dipping below acceptable performance standards. Based on the monitoring of the current utilization within the storage environment 115, the threshold module 132 may observe that the virtualization device node in the path of interest is currently handling 90,000 IOPS per port in the path of interest (i.e. 90% of the maximum utilization). In this example, the maximum utilization threshold may be set to 15% of maximum utilization, which means that the current 90,000 IOPs per port is within (i.e. 10%) the maximum utilization threshold of 15%. The threshold module 132 may alert the user that the current utilization is approaching the maximum utilization and is within the maximum utilization threshold. Exceeding the maximum utilization threshold may adversely impact one or more performance measures, and thus alerting the user may allow the user to take corrective action to address the negative impact to one or more performance measures.

Moreover, embodiments of the threshold module 132 may create an expected performance threshold associated with an expected performance for each performance measure of the one or more performance measures over the data path of interest. The threshold module 132 may first determine an expected performance measure of a particular performance measure, establish an expected performance threshold surrounding the expected performance of the performance measure, and then may alert a user that an actual performance of the performance measure is outside the expected performance threshold, or approaching the expected performance threshold. As an example, the threshold module 132 may determine that a storage device can support 4 GBps throughput, but at an unacceptably high latency. The same storage device is known to support 3.8 GBps throughput with 20 ms latency, and 3.5 GBps throughput at less than 5 ms latency. If the threshold module 132 measures 10 ms of latency at 2 GBps of throughput, a problem on the system may be detected because of this mismatch (i.e. 2 GBps of throughput is less than 3.5 GBps, but 10 ms of latency is greater than 5 ms). If the actual performance, which may be ascertained from the monitoring of the current utilization, comes within or is located outside the expected performance threshold, then the threshold module 132 may alert the user to allow the user to take a corrective action.

Referring still to FIG. 1, embodiments of the computing system 120 may further include an analytics module 133 for predicting a failure of the storage environment 115. Embodiments of the analytics module 133 may refer to configurations of hardware, software program code, or combinations of hardware and software programs, capable of analyzing data received or retrieved from the components 110 to determine an earliest incident of resource exhaustion so that a user may take a corrective action to correct, improve, address, etc. the potential system failure or performance degradation. Embodiments of the analytics module 133 may analyze historical or time-series maximum values of resource usage over time to predict when the expected performance will fall outside of an acceptable overall performance threshold for the data path of interest. For example, embodiments of the analytics module 133 may monitor and store component 110 resource usage or utilization, including a maximum daily, weekly, bi weekly monthly, bimonthly, or yearly value. Based on the gathered maximum values over time, embodiments of the analytics module 133 may project trends of maximum values of resource utilization. Using the projected trends, embodiments of the analytics module 133 may then extrapolate the projected trends to determine or predict a time in the future where the system 115 may experience a failure of one or more components 110 or an unacceptably low performance of one or more of the performance measures. For instance, embodiments of the analytics module 133 may extrapolate projected trends to determine when a projected maximum value will cause the expected performance for a performance measure to fall outside of the acceptable overall performance threshold for overall performance of the data path of interest. Embodiments of the acceptable overall performance threshold may be predetermined based on system requirements or needs. When the expected performance is predicted to be outside the overall performance threshold (or too close to an unacceptable overall performance), the analytics module 133 may conclude that the system 115 (or one or more component 110 thereof) may fail and/or experience resource exhaustion. The analytics module 133 may determine an earliest point in time that the incident of resource exhaustion may occur. As an example, it can be assumed that each year peak traffic grows 20% on a switch of the SAN. Analytics module 133 may calculate that the switch can handle the growth for three years before any ports are overloaded enough to cause a path to experience an unacceptable performance (i.e. outside acceptable overall performance threshold), based on the maximum values and other historical data gathered by the analytics module 133. Thus, a user may be notified of the earliest predicted incident of resource exhaustion, and may be able to plan when the switch needs to be replaced or expanded. Furthermore, a user may be notified when the earliest expected incident of resource exhaustion changes such that the earliest expected incident of resource exhaustion is within a predetermined time period from the original earliest expected incident of resource exhaustion. Continuing the example, the analytics module 133 observes that suddenly peak traffic on the switch grew 40% in a single month. Utilization is still within all acceptable performance measures for the switch, but now the date of earliest expected resource exhaustion has been impacted by the new traffic growth by X number of days or X % sooner than the originally projected date. The user may be notified of the change to plan accordingly.

With continued reference to FIG. 1, embodiments of the computing system 120 may include a reporting module 134. Embodiments of the reporting module 134 may include one or more components of hardware and/or software program code for reporting and/or alerting a user. For instance, embodiments of the reporting module 134 may communicate with a computing device associated with the user or the system 115 to report or otherwise provide an alert for one or more violations of calculated thresholds or resource exhaustion predictions for one or more component 110 of the SAN 115 so that the user may consider/develop a corrective action prior to failure. In other embodiments, the reporting module 134 may store diagnosed problems or threshold violations in data repository 125, which may be accessed by the user. Embodiments of the reporting module 134 may further generate detailed reports regarding updates and new information extracted by the computing system 120 regarding the components 110 of the SAN system 115, and display, send, or otherwise provide the reports to the user.

In some embodiments, the reporting module 134 may notify or otherwise report to the user a result of the analyzing by the analytics module 133. For example, the reporting module 134 may notify the user by sending a communication to a computing device that max utilization of a particular component 110 has been exceeded, and thus suggest an appropriate action for the user to take to regarding the diagnosed problem.

In further embodiments, the reporting module 134 may take action as a result of the analyzing by the analytics module 133. The action may be taken by the computing system 120 either instead of a notification to a user or in addition to sending a user notification. The actions performed by computing system 120 may be predetermined, and may be performed after a certain time period after determining earliest expected incident of resource exhaustion. As an example of action taken by the computing system 120, the reporting module 134 may automatically order more equipment or components of the SAN system identified as the one or more component 110 that may fail. If a particular component 110 is predicted to experience a failure, the computing system 120 may automatically generate an order to replace the component 110, which may be a purchase order or a request to purchase the component 110. Although the components 110 can be costly, the computing system 120 may replace cloud computing components on a more granularly level, which may require less supervision from a user, or even may be done automatically without a user supervision. Thus, the computing system 120 may take action by replacing (e.g. purchasing) a replacement component 110 automatically, without a user or an operator reviewing a notification sent by the reporting module 134, or reviewing the purchase order. In further embodiments, the computing system 120, after the analytics module 133 determines or predicts a failure or resource exhaustion of a component 110, may automatically shut off lower priority applications or users of the system 100, which may reduce a time to the failure of the component 110. Further, by automatically shutting off lower priority application and/or users, the earliest expected incident of resource exhaustion may no longer exceed a maximum utilization threshold for each resource of the one or more resources of the component 110. Accordingly, embodiments of the computing system 120 may perform actions, automatically or otherwise, in response to a detection or determination of an earliest expected incident of resource exhaustion on the data path of interest based on the analyzing of the maximum values of resource usage over time.

Referring still to FIG. 1, embodiments of the computer system 120 may be equipped with a memory device 142 which may store the resource usage or resource utilization information/data, reports, and a processor 141 for implementing the tasks associated with the predictive failure system 100.

Figure 2:
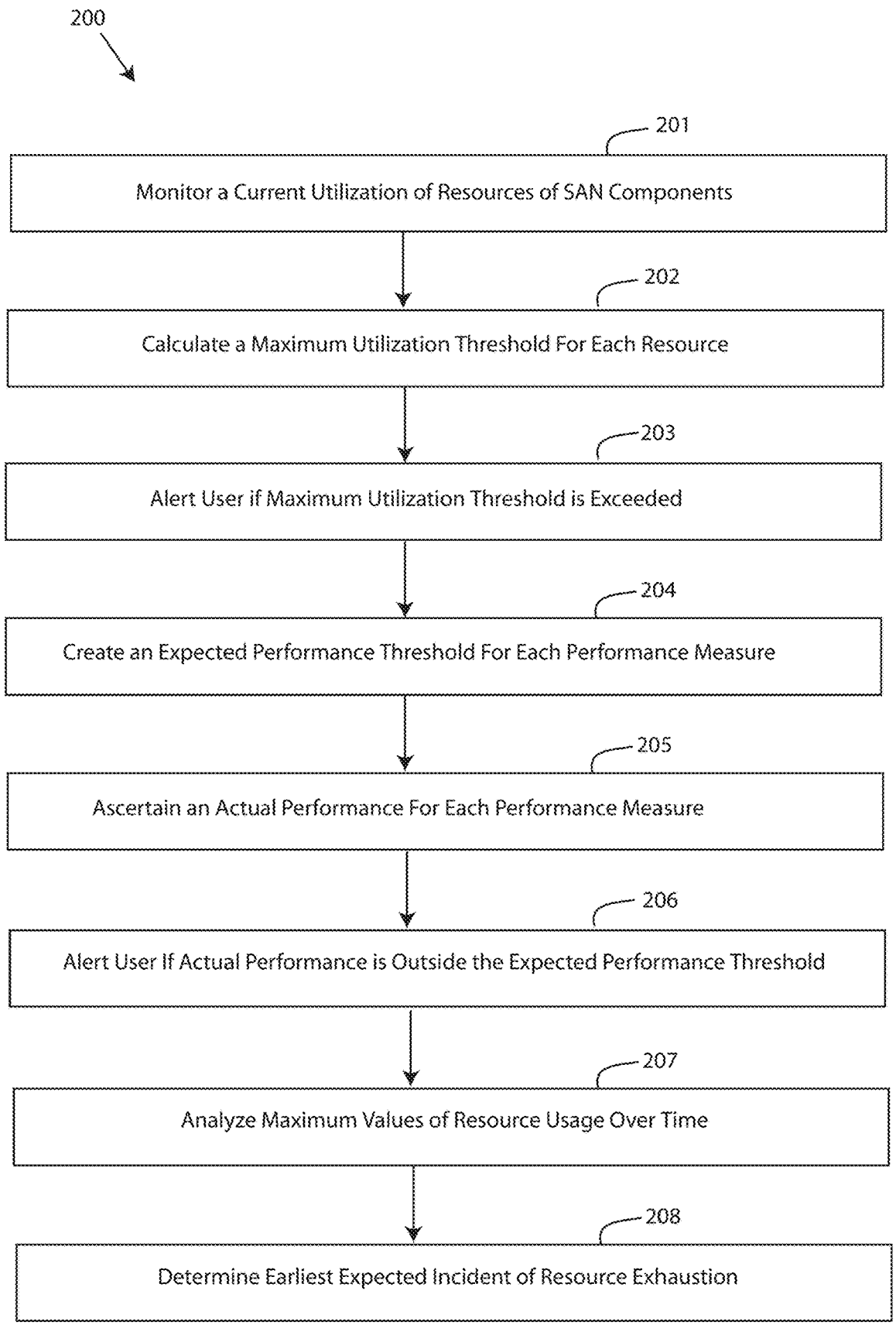
FIG. 2 depicts a flowchart of a method for predicting a failure of a complex storage environment, in accordance with embodiments of the present invention.

Referring now to FIG. 2, which depicts a flow chart of a method 200 for predicting a failure of a complex storage environment having a plurality of component and subcomponents, in accordance with embodiments of the present invention. One embodiment of a method 200 or algorithm that may be implemented for predicting a failure of a complex storage environment having a plurality of component and subcomponents in accordance with the predictive failure system 100 described in FIG. 1 using one or more computer systems as defined generically in FIG. 5 below, and more specifically by the specific embodiments of FIG. 1.

Figure 3:
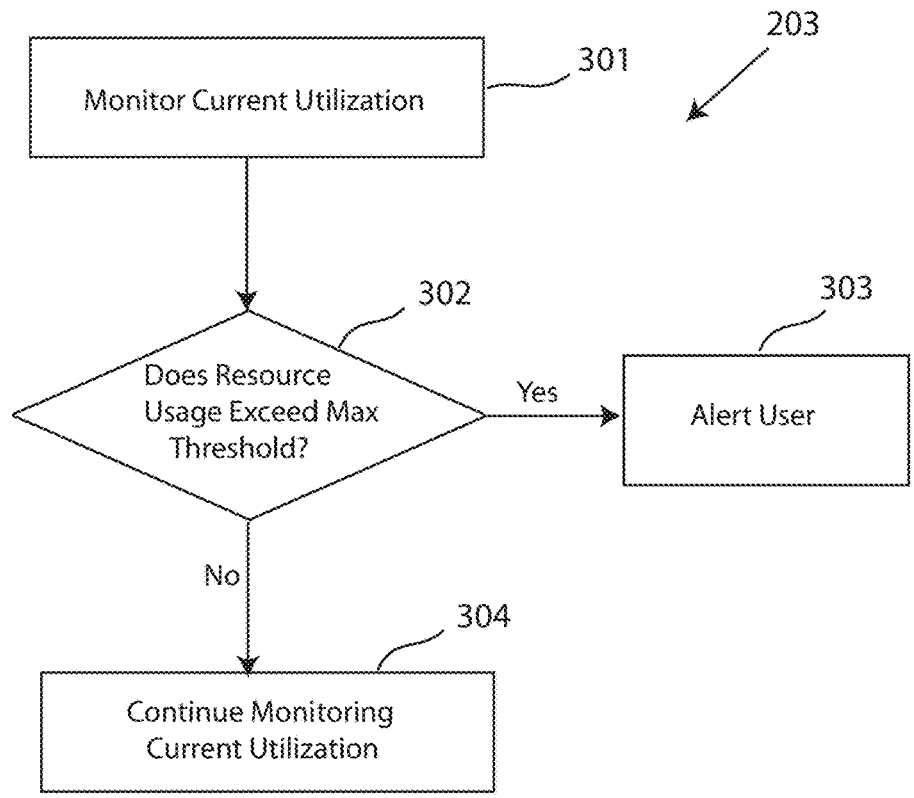
FIG. 3 depicts a flowchart of a step of the method of FIG. 2, in accordance with embodiments of the present invention.

Embodiments of the method 200 for predicting a failure of a complex storage environment having a plurality of component and subcomponents may begin at step 201 wherein a current utilization of resources of component 110. For instance, the current utilization of each component 110 or resources thereof may be monitored to gather information to be used in predicting a failure of the system 115. Step 202 calculates a maximum utilization threshold for each component resource. The maximum utilization threshold may be predetermined and adjusted based on system requirements. Step 203 alerts the user if the maximum utilization threshold for any of the resources has been exceeded. FIG. 3 depicts a block diagram of step 203 of the method of FIG. 2, in accordance with embodiments of the present invention. Step 301 monitors current utilization (as performed in step 201). Step 302 determines whether a resource usage exceeds the maximum utilization threshold. If yes, step 303 alerts the user. Alerting the user may include sending an electronic communication or may include sending a generated detail report of the violation of the threshold, along with a suggested action to correct the problem, or reduce the utilization. If no, step 304 continues to monitor the current utilization for each resource of the components 110.

Figure 4:
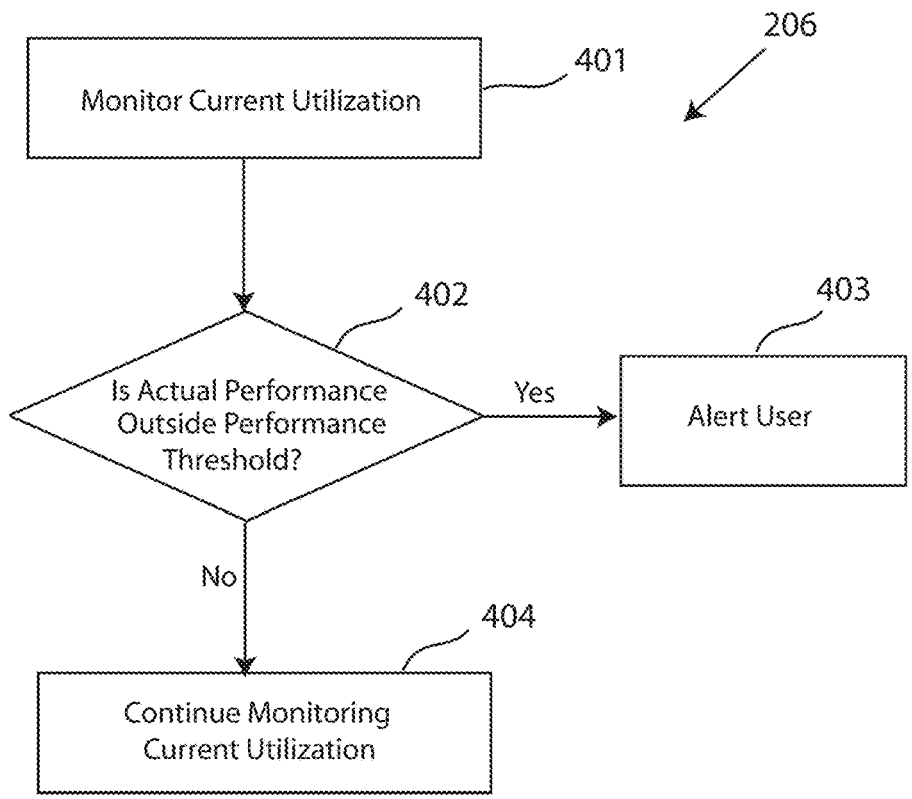
FIG. 4 depicts a flowchart of a step of the method of FIG. 2, in accordance with embodiments of the present invention.

Referring back to FIG. 2, step 204 creates an expected performance threshold for each performance measure. The expected performance threshold may be predetermined and adjusted based on system requirements. Step 205 ascertains or obtains an actual performance for each performance measure. Obtaining the actual performance may be derived from the monitoring of the current utilization of the component resources. Step 206 alerts the user if the actual performance is outside the expected performance threshold. FIG. 4 depicts a block diagram of step 206 of the method of FIG. 2, in accordance with embodiments of the present invention. Step 401 monitors current utilization (as performed in step 201). Step 402 determines whether the actual performance is outside the expected performance threshold. If yes, step 403 alerts the user. Alerting the user may include sending an electronic communication or may include sending a generated detail report of the violation of the threshold, along with a suggested action to correct the problem, or increase the performance. If no, step 404 continues to monitor the current utilization for each resource of the components 110.

Referring back to FIG. 2, step 207 analyzes maximum values of resource usage over time to obtain maximum value trends. Step 208 determines an earliest expected incident of resource exhaustion, based on the analyzing. The earliest date of an expected incident of resource exhaustion or failure of the system 115 may be communicated to the user such that the user is notified accordingly. Providing the earliest expected failure of one or more components 110 not only helps diagnose the problems occurring with the complex storage environment 115, but allows the user to adequately and effectively manage the system 115 to avoid a shutdown or failure of the system 115.

Figure 5:
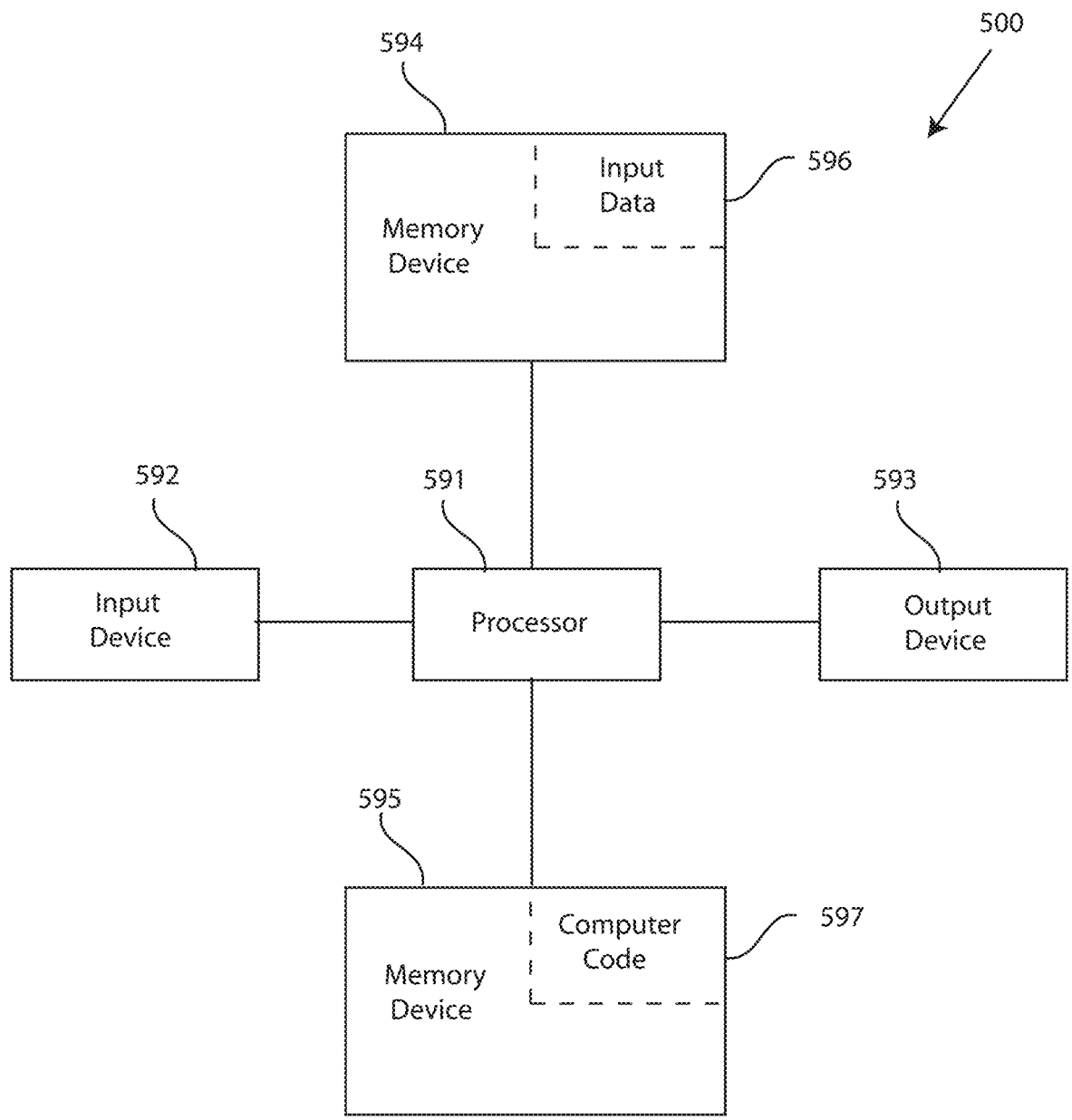
FIG. 5 illustrates a block diagram of a computer system for the predictive failure system of FIG. 1, capable of implementing methods for predicting a failure of a complex storage environment of FIGS. 2-4, in accordance with embodiments of the present invention.

FIG. 5 illustrates a block diagram of a computer system for the predictive failure system of FIG. 1, capable of implementing methods for predicting a failure of a complex storage environment of FIGS. 2-4, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for predicting a failure of a complex storage environment, in the manner prescribed by the embodiments of FIGS. 2-4 using the predictive failure system of FIG. 1, wherein the instructions of the computer code 597 may be executed by processor 591 via memory device 595. The computer code 597 may include software or program instructions that may implement one or more algorithms for implementing the methods for predicting a failure of a complex storage environment, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 5.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to predictive failure systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to provide a predictive failure system for complex storage environments. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for predicting a failure of a complex storage environment. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for predicting a failure of a complex storage environment.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
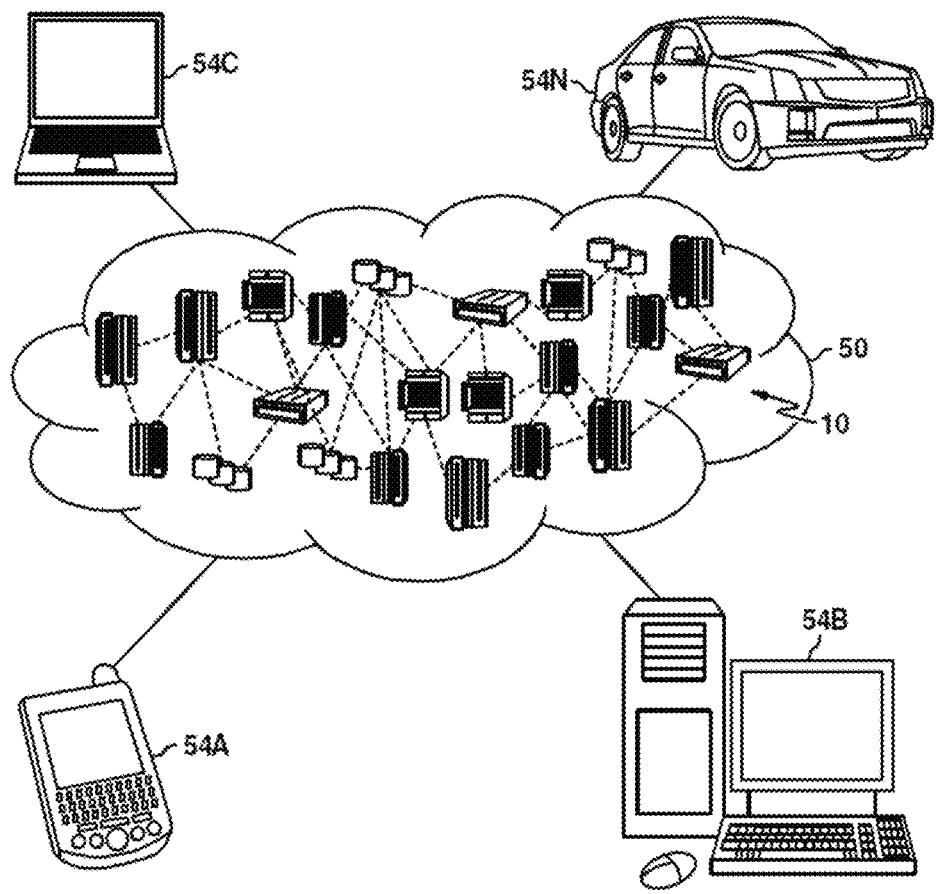
FIG. 6 depicts a cloud computing environment, in accordance with embodiments of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 6 are intended to be illustrative only and that computing nodes 10 and cloud computing environment 50 can communicate with any type of computerized device over any type of network and/or network addressable connection (e.g., using a web browser).

Figure 7:
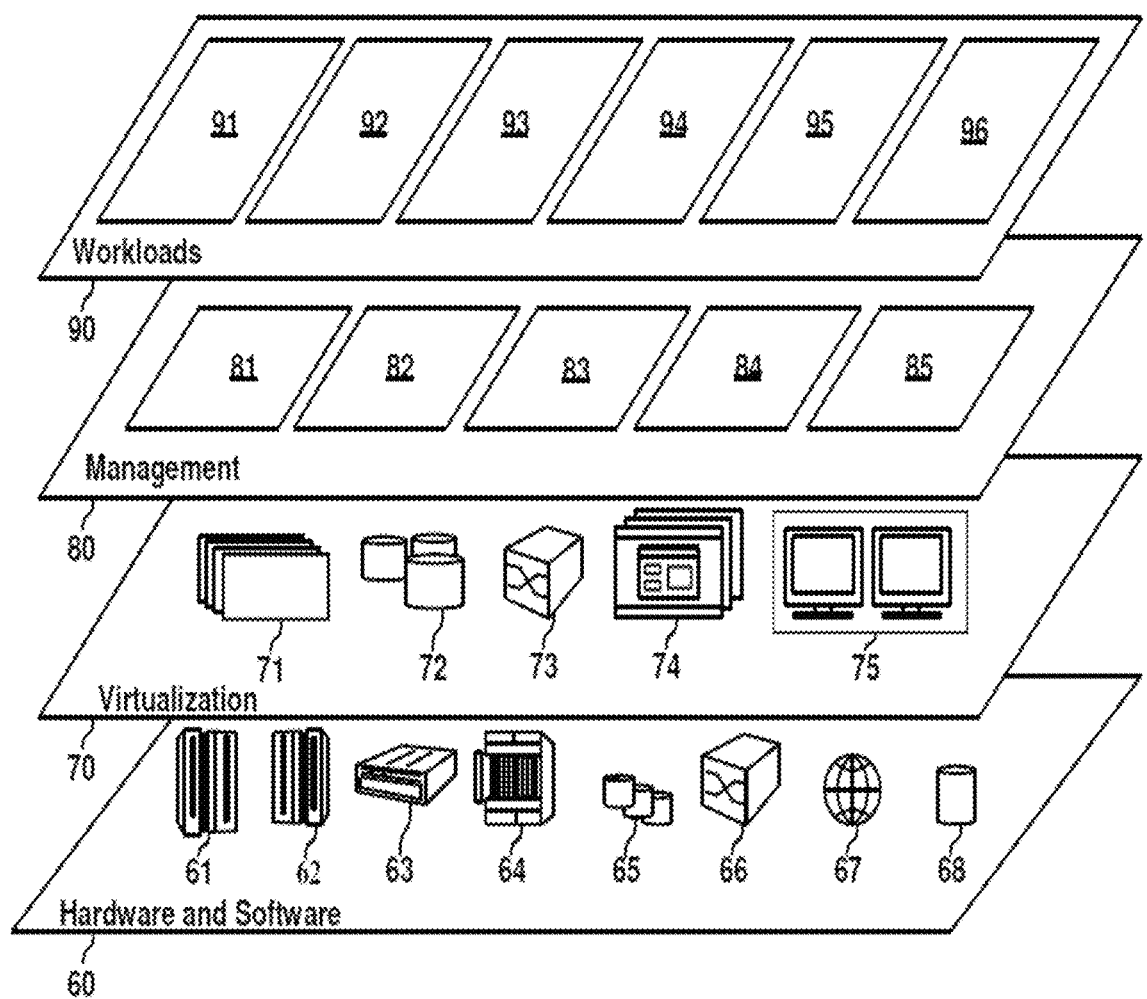
FIG. 7 depicts abstraction model layers, in accordance with embodiments of the present invention.

Referring now to FIG. 7, a set of functional abstraction layers provided by cloud computing environment 50 (see FIG. 6) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68, and may further include SAN switches, storage virtualization devices, and storage controllers.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and predictive failure analysis 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for predicting a failure or performance degradation of a storage environment having a plurality of component and subcomponents, the method comprising:
    monitoring, by a processor of a computing system, a current utilization of one or more resources associated with the plurality of components and subcomponents over a data path of interest, wherein the one or more resources affect one or more performance measures of the storage environment;
    calculating, by the processor, a maximum utilization threshold for each resource of the one or more resources, such that exceeding the maximum utilization threshold impacts one or more performance measures, wherein the maximum utilization threshold is based on a maximum utilization of a component of the storage environment;
    creating, by the processor, an expected performance threshold associated with an expected performance for each performance measure of the one or more performance measures over the data path of interest;
    ascertaining, by the processor, an actual performance for each performance measure based on the monitoring of the current utilization;
    analyzing, by the processor, maximum values of resource usage over time to predict when the expected performance will fall outside of an overall performance threshold for the data path of interest; and
    determining, by the processor, an expected incident of resource exhaustion on the data path of interest based on the analyzing of the maximum values of resource usage over time;
    wherein the computing system automatically performs a corrective action in response to the determining an expected incident of resource exhaustion on the data path of interest, the corrective action including automatically generating a purchase order to purchase a replacement component without a user reviewing the purchase order.

2. The method of claim 1, further comprising alerting a user when at least one of the maximum utilization threshold is exceeded and the actual performance is outside the expected performance threshold.

3. The method of claim 1, wherein, in response to the determining, a user is notified of the expected incident of resource exhaustion, further wherein resource exhaustion represents the failure or performance degradation of the storage environment.

4. The method of claim 1, wherein a user is notified when the expected incident of resource exhaustion changes such that the expected incident of resource exhaustion is within a predetermined time period from the original expected incident of resource exhaustion.

5. The method of claim 1, wherein the one or more component and subcomponents of the storage environment is selected from the group consisting of: a server, a host bus adapter (HBA), an edge switch, a core switch, a converged network switch, a SAN volume controller (SVC) or other storage virtualization device, a back end storage device or appliance, a backup or archive device or appliance, a port, a controller, a disk, an array, a node, and an I/O group.

6. The method of claim 1, wherein the one or more resources include a bandwidth of ports, an internal or external bus, a connection, a buffer pool, an available cache, a processing power, a disk space, and a pool space.

7. The method of claim 1, wherein the one or more performance measures are selected from the group consisting of: a completed input output per second (IOPS), a throughput, a latency, and a drop rate of frames, packets, input and outputs (IOs), or transactions.

8. A computer system, comprising:
a processor;
a memory device coupled to the processor; and
a computer readable storage device coupled to the processor, wherein the storage device contains program code executable by the processor via the memory device to implement a method for predicting a failure or performance degradation of a storage environment having a plurality of component and subcomponents, the method comprising:
  monitoring, by a processor of a computing system, a current utilization of one or more resources associated with the plurality of components and subcomponents over a data path of interest, wherein the one or more resources affect one or more performance measures of the storage environment;
  calculating, by the processor, a maximum utilization threshold for each resource of the one or more resources, such that exceeding the maximum utilization threshold impacts one or more performance measures, wherein the maximum utilization threshold is based on a maximum utilization of a component of the storage environment;
  creating, by the processor, an expected performance threshold associated with an expected performance for each performance measure of the one or more performance measures over the data path of interest;
  ascertaining, by the processor, an actual performance for each performance measure based on the monitoring of the current utilization;
  analyzing, by the processor, maximum values of resource usage over time to predict when the expected performance will fall outside of an overall performance threshold for the data path of interest; and
  determining, by the processor, an expected incident of resource exhaustion on the data path of interest based on the analyzing of the maximum values of resource usage over time;
  wherein the computing system automatically performs a corrective action in response to the determining an expected incident of resource exhaustion on the data path of interest, the corrective action including automatically generating a purchase order to purchase a replacement component without a user reviewing the purchase order.

9. The computer system of claim 8, further comprising alerting a user when at least one of: the maximum utilization threshold is exceeded and the actual performance is outside the expected performance threshold.

10. The computer system of claim 8, wherein a user is notified of the expected incident of resource exhaustion, further wherein resource exhaustion represents the failure or performance degradation of the storage environment.

11. The computer system of claim 8, wherein the one or more component and subcomponents of the storage environment is selected from the group consisting of: a server, a host bus adapter (HBA), an edge switch, a core switch, a converged network switch, a SAN volume controller (SVC) or other storage virtualization device, a back end storage device or appliance, a backup or archive device or appliance, a port, a controller, a disk, an array, a node, and an I/O group.

12. The computer system of claim 8, wherein the one or more resources include a bandwidth of ports, an internal or external bus, a connection, a buffer pool, an available cache, a processing power, a disk space, and a pool space.

13. The computer system of claim 8, wherein the one or more performance measures are selected from the group consisting of: a completed input output per second (IOPS), a throughput, a latency, and a drop rate of frames, packets, input and outputs (IOs), or transactions.

14. A computer program product, comprising a computer readable hardware storage device storing a computer readable program code, the computer readable program code comprising an algorithm that when executed by a computer processor of a computing system implements a method for predicting a failure or performance degradation of a storage environment having a plurality of component and subcomponents, comprising:
  monitoring, by a processor of a computing system, a current utilization of one or more resources associated with the plurality of components and subcomponents over a data path of interest, wherein the one or more resources affect one or more performance measures of the storage environment;
  calculating, by the processor, a maximum utilization threshold for each resource of the one or more resources, such that exceeding the maximum utilization threshold impacts one or more performance measures, wherein the maximum utilization threshold is based on a maximum utilization of a component of the storage environment;
  creating, by the processor, an expected performance threshold associated with an expected performance for each performance measure of the one or more performance measures over the data path of interest;
  ascertaining, by the processor, an actual performance for each performance measure based on the monitoring of the current utilization;
  analyzing, by the processor, maximum values of resource usage over time to predict when the expected performance will fall outside of an overall performance threshold for the data path of interest; and
  determining, by the processor, an expected incident of resource exhaustion on the data path of interest based on the analyzing of the maximum values of resource usage over time;
  wherein the computing system automatically performs a corrective action in response to the determining an expected incident of resource exhaustion on the data path of interest, the corrective action including automatically generating a purchase order to purchase a replacement component without a user reviewing the purchase order.

15. The computer program product of claim 14, further comprising alerting a user when at least one of the maximum utilization threshold is exceeded and the actual performance is outside the expected performance threshold.

16. The computer program product of claim 14, wherein, in response to the determining a user is notified of the expected incident of resource exhaustion, further wherein resource exhaustion represents the failure or performance degradation of the storage environment.

17. The computer program product of claim 14, wherein a user is notified when the expected incident of resource exhaustion changes such that the expected incident of resource exhaustion is within a predetermined time period from the original expected incident of resource exhaustion.

18. The computer program product of claim 14, wherein the one or more resources include a bandwidth of ports, an internal or external bus, a connection, a buffer pool, an available cache, a processing power, a disk space, and a pool space.

19. The computer program product of claim 14, wherein the one or more performance measures are selected from the group consisting of: a completed input output per second (IOPS), a throughput, a latency, a drop rate of frames, packets, input and outputs (IOs), or transactions.

\* \* \* \* \*